United States Patent
Pinkerton

(10) Patent No.: US 10,913,471 B2
(45) Date of Patent: Feb. 9, 2021

(54) SYSTEM FOR LINKING ALARM DATA FROM PHYSICALLY DISASSOCIATED WIRELESS SENSORS TO A TRAIN IN MOTION

(71) Applicant: Aktiebolaget SKF, Gothenburg (SE)

(72) Inventor: Alexander Pinkerton, Aberdeen (GB)

(73) Assignee: Aktiebolaget SKF, Gothenburg (SE)

( * ) Notice: Subject to any disclaimer, the term of this patent is extended or adjusted under 35 U.S.C. 154(b) by 183 days.

(21) Appl. No.: 16/131,115

(22) Filed: Sep. 14, 2018

(65) Prior Publication Data
US 2020/0086902 A1   Mar. 19, 2020

(51) Int. Cl.
*B61L 15/00*   (2006.01)
*G01K 13/00*   (2006.01)
*B61L 3/22*   (2006.01)

(52) U.S. Cl.
CPC ............ *B61L 15/0081* (2013.01); *B61L 3/22* (2013.01); *B61L 15/0027* (2013.01); *G01K 13/00* (2013.01)

(58) Field of Classification Search
CPC .... B61L 15/0081; B61L 15/0027; B61L 3/22; G01K 13/00; G01K 13/08; G01K 3/10; G01K 3/005
See application file for complete search history.

(56) References Cited

U.S. PATENT DOCUMENTS

| | | | |
|---|---|---|---|
| 5,223,844 A | 6/1993 | Mansell | |
| 5,963,879 A | 10/1999 | Woodward | |
| 7,843,090 B2 | 11/2010 | Roberts | |
| 7,940,210 B2 | 5/2011 | Fly | |
| 2003/0236598 A1* | 12/2003 | Villarreal Antelo | ........................ B61L 27/0022 701/19 |
| 2012/0085871 A1* | 4/2012 | Chun | ........................ B61B 1/00 246/2 S |
| 2016/0176425 A1* | 6/2016 | Traylor | ............... B61L 15/0072 701/19 |
| 2016/0359741 A1* | 12/2016 | Cooper | ............... B61L 15/0072 |
| 2018/0208221 A1* | 7/2018 | Singh | ....................... B61K 9/06 |

* cited by examiner

*Primary Examiner* — Peter D Nolan
*Assistant Examiner* — Ashley L Redhead, Jr.
(74) *Attorney, Agent, or Firm* — Garcia-Zamor Intellectual Property Law; Ruy Garcia-Zamor; Bryan Peckjian

(57) ABSTRACT

A system for linking alarm data from physically disassociated wireless sensors to a train in motion. The sensor secured to a wheel axle-box of a rail carriage of a train to detect an over temperature alarm to enable a driver to stop the train. If the alarm condition is confirmed as belonging to the train, a Monitor/Relay immediately notes that there is a problem and warns an operator.

18 Claims, 8 Drawing Sheets

SYSTEM FOR LINKING ALARM DATA FROM PHYSICALLY DISASSOCIATED WIRELESS SENSORS TO A TRAIN IN MOTION

FIELD OF THE INVENTION

This invention relates to a system for linking alarm data from physically disassociated wireless sensors to a train in motion. In particular, this invention relates to a system for linking alarm data from physically disassociated wireless sensors to a train in motion, where the wireless sensor is secured to a wheel axle-box of a rail carriage of a train to detect an over temperature alarm.

BACKGROUND OF THE INVENTION

In the field of rail industry safety, when any wheel bearing on a rail carriage goes into temperature alarm, it is essential that the driver of the train be notified of the problem almost immediately. This is because an unexpected and significant rise in the temperature of a wheel bearing, is typically the precursor to a catastrophic failure of that bearing.

SUMMARY OF THE INVENTION

The basic inventive concept provides a system for linking alarm data from physically disassociated wireless sensors to a train in motion, the wireless sensor secured to a wheel axle-box of a rail carriage of a train to detect an over temperature alarm in order to enable a driver to slow or stop the train. The system having an in-cab monitor including a processor connected to a memory, a keypad, a display, a GPS, a cellular modem and a network, the current location of the wireless sensor being fixed with the GPS, the GPS fixed current location of the wireless sensor being published with relevant details of the over temperature alarm over a cellular wireless transmitter to a "Publish and Subscribe" Message Broker, the relevant details of the over temperature alarm message pushed to a Server where the alarm is then validated, the GPS location transcribed into a new "location bin topic" for the Message Broker, wherein the details of the alarm are then published to this topic, a geographic location of a monitor/relay that is mounted in a driver's cab at a front end of the engine is fixed with GPS, the fixed geographic location of the monitor/relay is used to subscribe to the same location bin topic that the server just published the details of the new alarm to, the wheel alarm notification is pushed to the monitor/relay system with the message broker, validation checks with the monitor/relay system are carried out to determine whether the alarm as received, is associated with one of the current train's coaches, if the alarm condition is confirmed as belonging to the current train, the Monitor/Relay immediately notes that there is a problem.

A first aspect of the present invention provides each country of the world being divided into a UTM based cell grid of "Bins", and assigning each Bin a unique, fourteen-digit Identifier consisting of a four-digit operator code, a four-digit incremental Longitude number, as well as a four-digit incremental Latitude number, with three point separating characters between each group.

In a second aspect of the present invention the Bin identifiers being used as Message Broker topics, with each topic effectively identifying a specific geographic area, roughly 10 km by 10 km in size, and wherein when any sensor goes into alarm, the sensor's GPS location is used to determine exactly what Bin the alarm was raised in, and a new alarm notification is then published to that Bin's specific identifier topic.

In a third aspect of the present invention each train's Monitor/Relay determines its own GPS position, and wherein the position is used to continuously recalculate what Bins it is moving through and what associated Message Broker topics it should both subscribe to and unsubscribe from.

In yet another aspect of the present invention the three Bins are designated for low-speed speed commuter services, and where up to six Bins are designated for high-speed cross-country services, the designations being referred to as "Rolling Location Binning."

In yet another aspect of the present invention whether any individual Monitor/Relay either accepts or rejects the alarm notification it has received is determined, where every coach follows the path of the coach in front of it, and as such, for a specific ground position, whatever a direction vector of a carriage moving over that position, all carriages in the train have the same direction vector while moving over that position, where each train's Monitor/Relay receives, processes and saves: a 'fix' of its GPS location as well as, and its speed over ground and its direction every second, and when the Monitor/Relay receives an alarm notification, it compares its own speed against the speed of the sensor, at the time when the alarm was initially reported, and then compares it's direction at the exact geographic location where the alarm was initially reported, where the two checks allow the Monitor/Relay to either accept or reject ownership of the received alarm, and where the Monitor/Relay then publishes this decision to the same topic that the alarm notification was initially published to.

In yet another aspect of the present invention when at least two trains from a same operator's fleet, are moving on parallel tracks, and are both heading into the same station at the same time, and one of the wheel sensors on either of the at least two trains publishes an alarm, both monitor/Relay systems accept ownership of the alarm.

In yet another aspect of the present invention the speeds of at least a first train to at least a second train are compared, as well as the directions, and given that each Monitor/Relay publishes its ownership claim of the alarm to the same Bin topic that the alarm was initially published to, both claims will subsequently be pushed to both Monitor/Relay systems, where each Monitor/Relay compares its own claim of the alarm notification against the claim made by its peer, one will yield and publish this 'yield' notification back to the Bin topic, allowing the actual owner of the alarm notification to raise an internal alarm within the cab, alerting the driver to alarm as detected.

In yet another aspect of the present invention the network is one of a LAN and a WLAN.

In yet another aspect of the present invention the operation of the monitor/relay does not require any knowledge about the engine or carriage configuration.

In a final aspect of the present invention where the relevant details of the over temperature alarm include temperature rise.

These and other advantages of the invention will be further understood and appreciated by those skilled in the art by reference to the following written specification, claims and appended drawings.

BRIEF DESCRIPTION OF THE SEVERAL VIEWS OF THE DRAWINGS

The invention will now be described, by way of example, with reference to the accompanying drawings, in which.

DETAILED DESCRIPTION OF THE INVENTION

Figure 1:
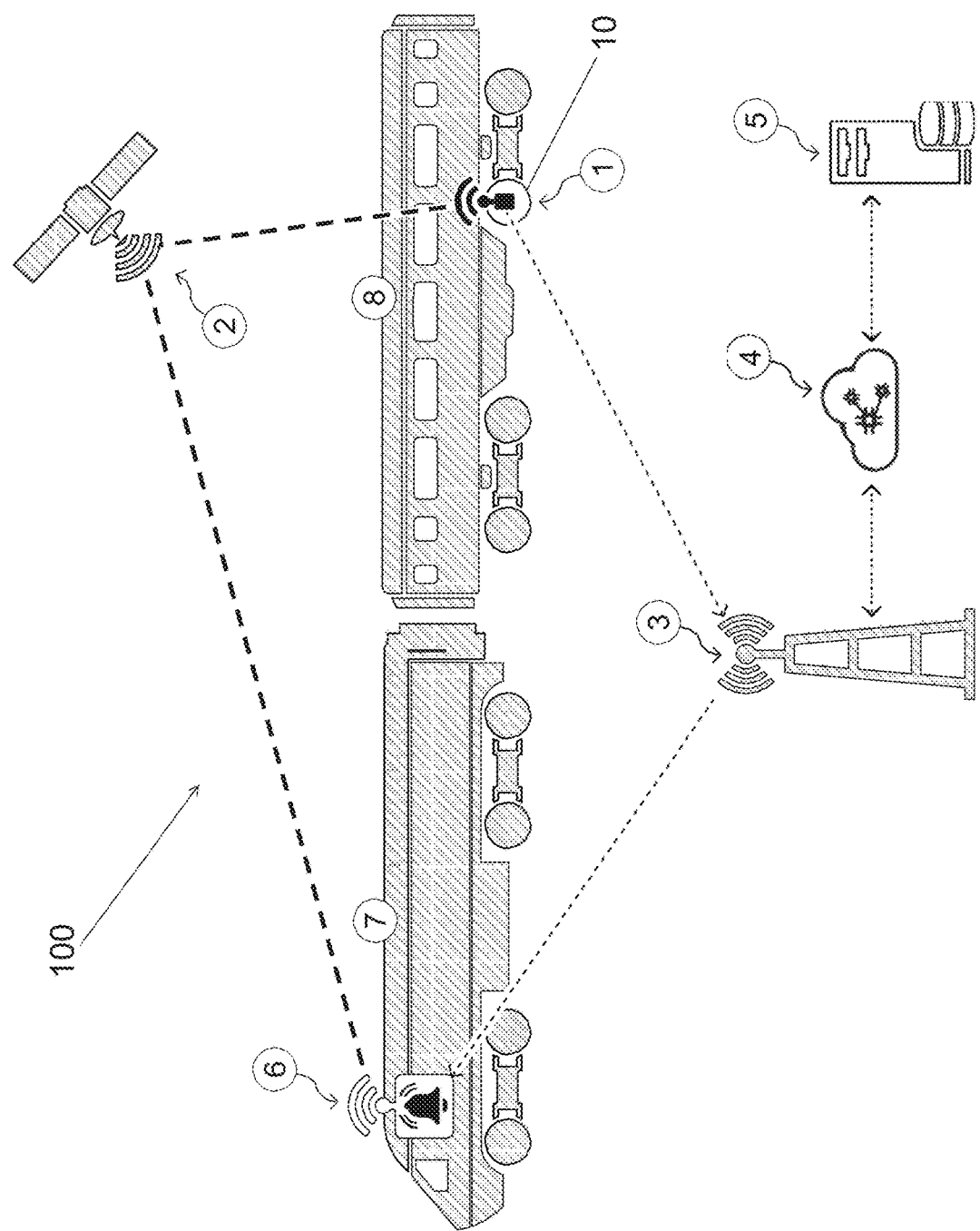
FIG. 1 is perspective view of the system components according to a preferred embodiment of the present invention.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 illustrates a system 100 for linking alarm data from physically disassociated wireless sensors 1 to a train 9 in motion. The wireless sensor 1 is secured to a wheel axle-box 10 of a rail carriage 8 of the train 8 to detect an over temperature alarm in order to enable a driver (not shown) to slow or stop the train. The relevant details of the over temperature alarm include temperature rise.

Figure 2:
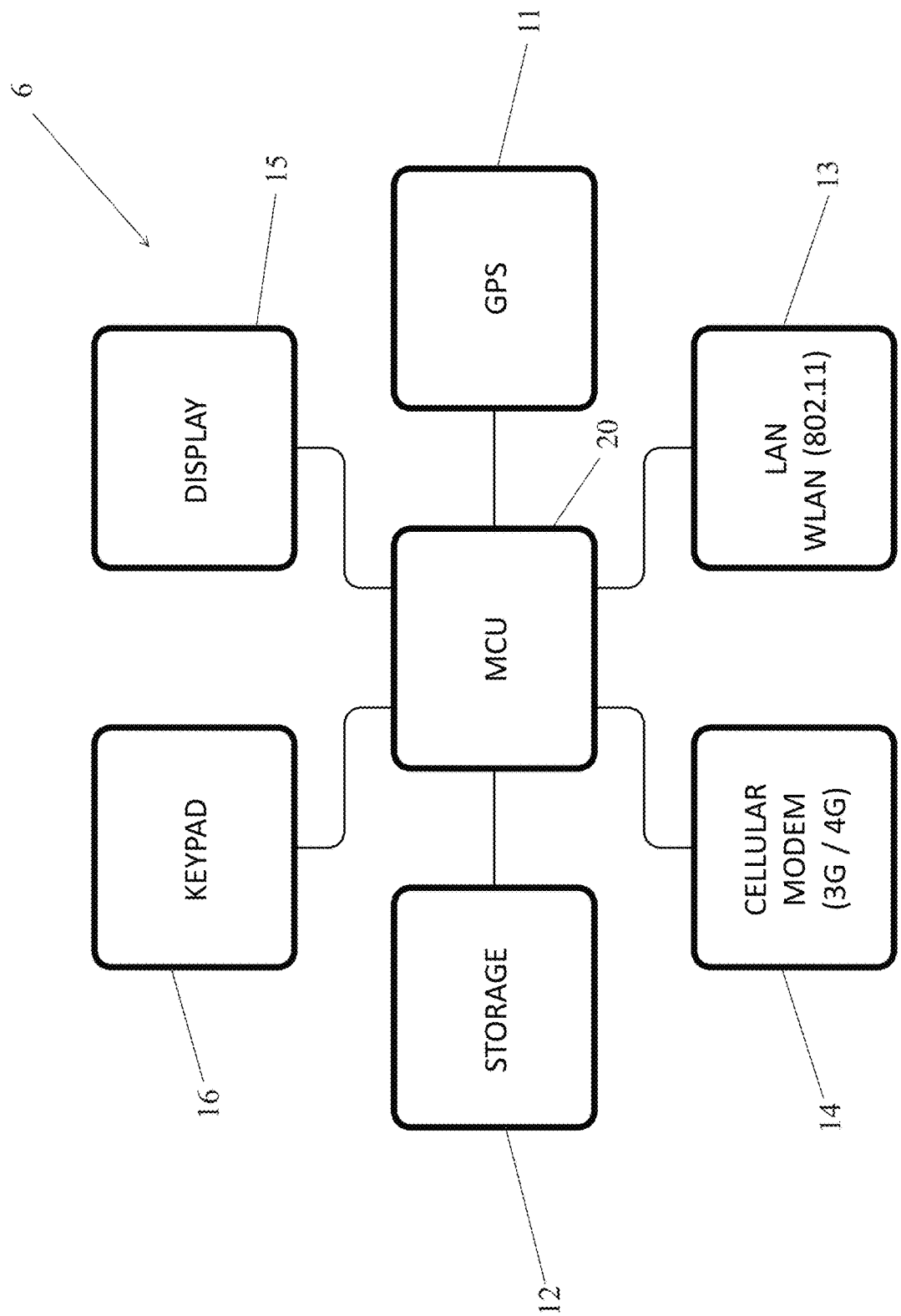
FIG. 2 is a block diagram of the components that make up an in-cab computer according to a preferred embodiment of the present invention.

FIG. 2 illustrates an in-cab computer or monitor/relay 6 that provides a processor 20 connected to a computer readable storage medium or memory 12, a keypad 16, a display 15, a GPS 11, a cellular modem 14 and a network 13. During operation, the current location of the wireless sensor 1 is fixed by way of the GPS 11. The term GPS is meant to include any satellite based navigation system including the US GPS or the EU Galileo. Additionally, the monitor/relay 6 automatically associates itself with any wireless sensor that reports an alarm against any wheel in the current train. Operation of the monitor/relay does not require any knowledge about the engine or carriage configuration. The monitor/relay allows multiple faults to be stored in the memory for review by track-side maintenance.

When the wireless sensor 1, which is secured to the wheel axle-box 10 of the rail carriage 8, detects an over temperature alarm, it fixes its current location using GPS 2 and then uses cellular wireless 3 to publish all relevant details of the alarm to a "Publish and Subscribe" Message Broker 4. This alarm message is then "pushed" to a Server 5 where the alarm is validated, the GPS location transcribed into a new 'location bin topic' for the Message Broker 4 and details of the alarm are then published to this topic.

While this is happening, the "Monitor/Relay" 6 which is mounted in driver's cab at the front of the engine 7, is also using GPS 2 to fix its own geographic location and then using this location to subscribe to the same 'location bin topic' that the server 5 has just published details of the new alarm to.

The Message Broker 4 then "pushes" the wheel alarm notification to the "Monitor/Relay" system 6, which then carries out many validation checks to determine whether the alarm (as received), is associated with one of the current train's coaches 8. If the alarm condition is confirmed as belonging to the current train, the Monitor/Relay 6 notifies the driver immediately that there is a problem. The driver can then act accordingly and (if necessary) slow or even stop the train.

Figure 3:
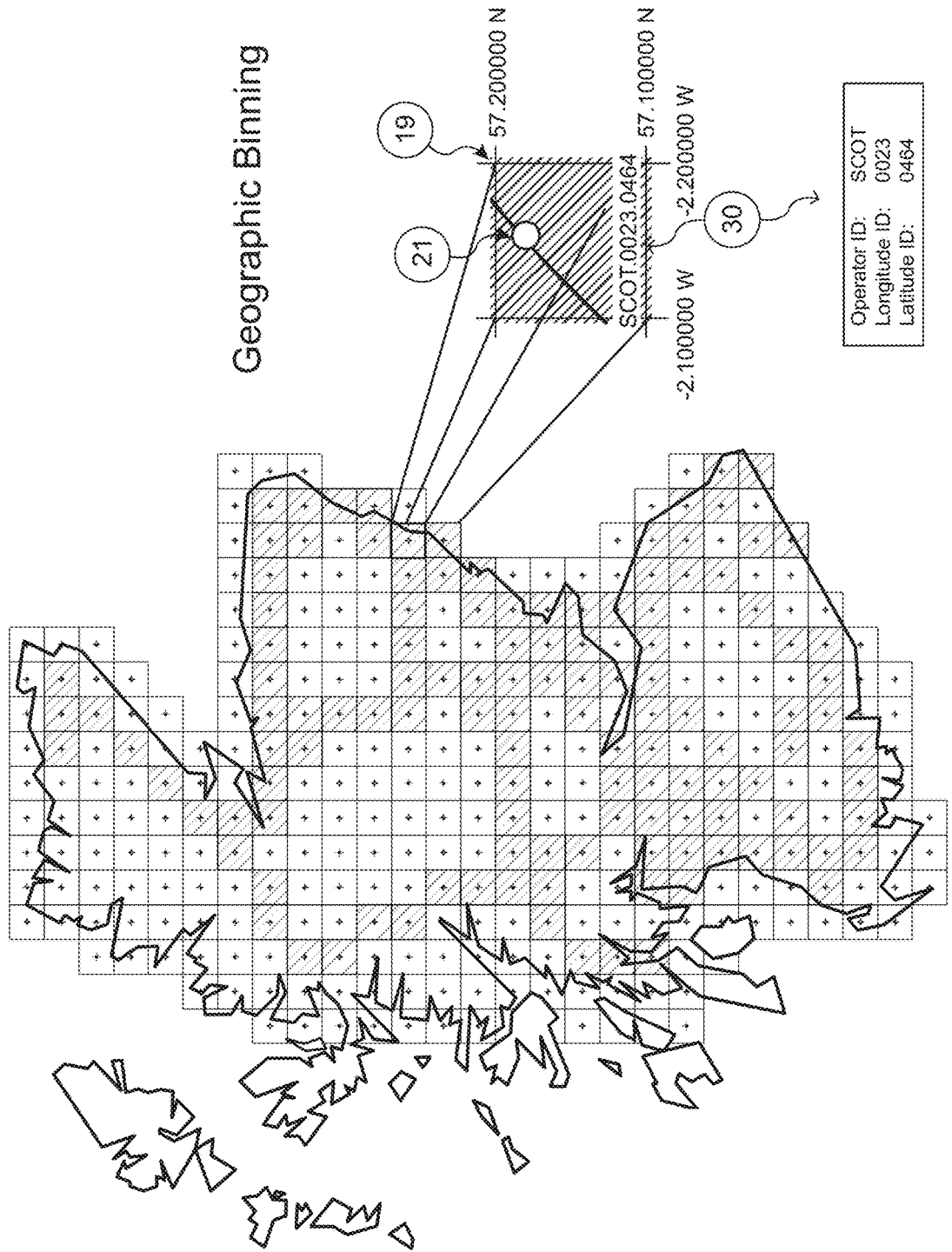
FIG. 3 is a plan view showing the concept of geometric binning according to a preferred embodiment of the present invention.

FIG. 3 illustrates Geographic Location Binning. Here, each country is divided into a UTM based cell grid of "Bins", with each Bin 19 being 0.1° Longitude by 0.1° Latitude in size, with a 5% overlap. Every Bin 19 is then assigned a unique, fourteen-digit Identifier 30 consisting of a four-digit operator code, a four-digit incremental Longitude number, as well as a four-digit incremental Latitude number, with three point separating characters between each group.

These Bin identifiers 30 are then used as Message Broker 4 topics, with each topic effectively identifying a specific geographic area, roughly 10 km by 10 km in size. When any sensor goes into alarm, the sensor's GPS location is used to determine exactly what Bin the alarm was raised in, and a new alarm notification is then published to that Bin's specific identifier topic 30.

Meanwhile, each train's Monitor/Relay 6 is also determining its own GPS position, and then using this position to constantly recalculate what Bins 19 it is moving through 21 and what associated Message Broker 4 topics it should both subscribe to and unsubscribe from. The actual number of Bins that a train's Monitor/Relay 6 will be subscribed to is determined by its speed. For example, three Bins for low-speed speed commuter services, up to (potentially) six Bins for high-speed cross-country services. This will be referred to as "Rolling Location Binning"

However, the usage of Rolling Location Binning means that any alarm published to a specific Bin will be received and analysed by all train Monitor/Relays 6 which are still subscribed to that Bin. As the number of trains this could affect is unknown, the invention now must determine whether any individual Monitor/Relay 6 should either accept or reject the alarm notification it has received. How this is done is covered in the next section of this disclosure.

Figure 4:
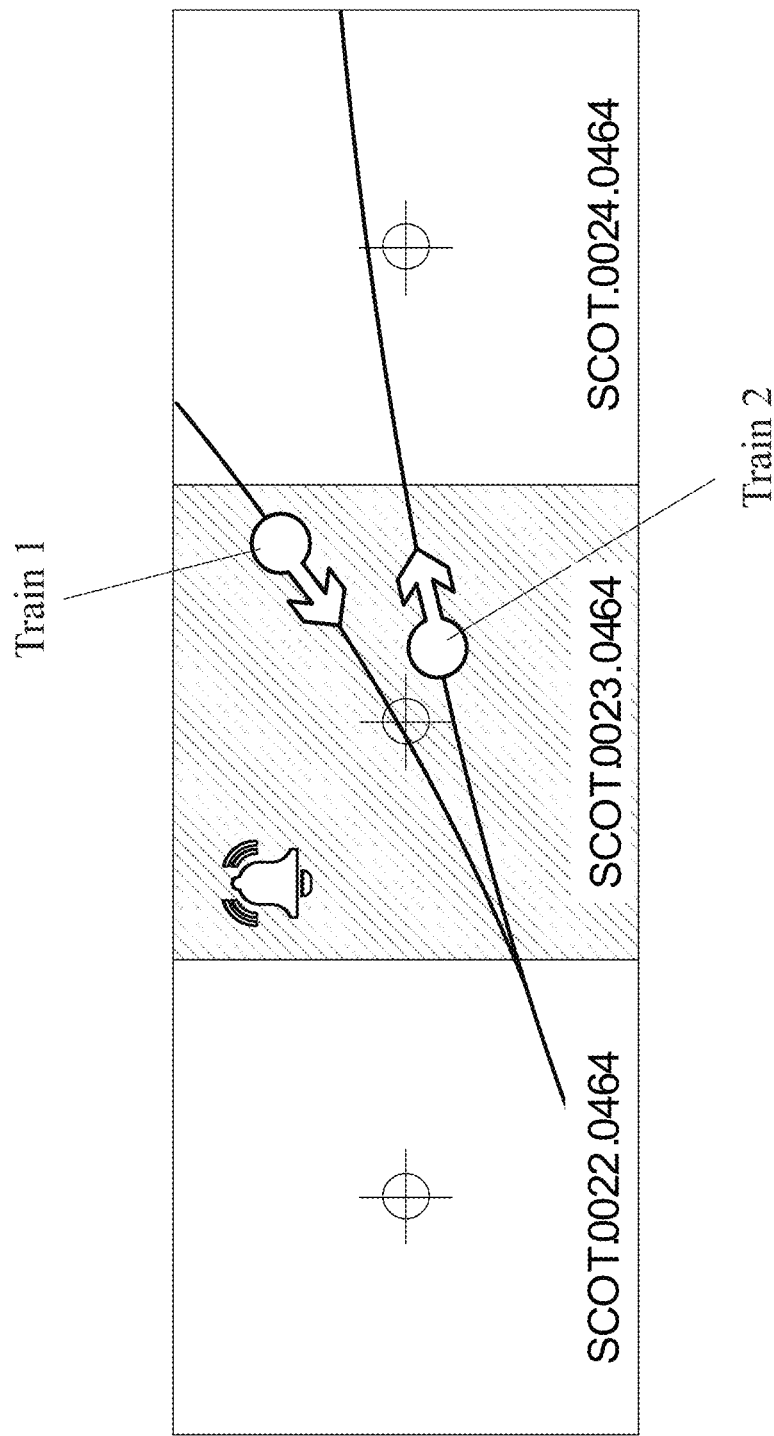
FIG. 4 is a plan view of rolling location binning according to a preferred embodiment of the present invention.

Although Rolling Location Binning will limit alarm notifications to only those trains that have subscribed to the affected Bins, it cannot (by itself) be used to determine what alarms are directly associated with what train. For example: as illustrated in FIG. 4, we see two trains passing each other inside the same Bin. Given both trains will be subscribed to the same Location Topic (SCOT.0023.0464), we need to understand how the Monitor/Relay in each cab will determine which of these two trains should take ownership of the sensor alarm.

Figure 5:
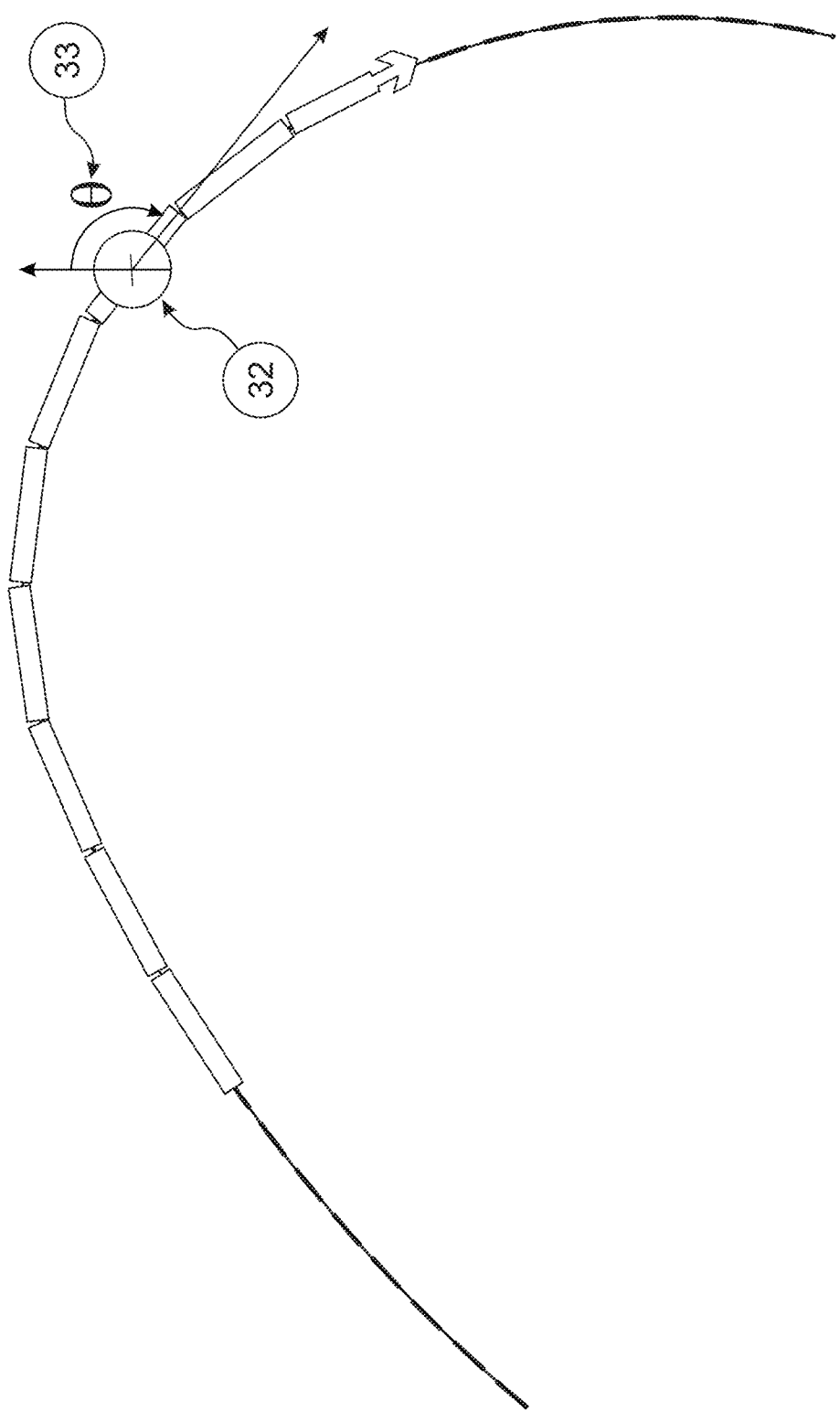
FIG. 5 is a top plan view of a train moving on a track showing a direction of a single car being broken into its vector components according to a preferred embodiment of the present invention.

Irrespective of how many coaches make up a train, every coach will follow the path of the coach in front of it (see FIG. 5). This means that for a specific ground position 41, whatever the direction vector 42 of the carriage moving over that position 41, all carriages in the train have the same direction vector 42 while moving over that position 41. There are no exceptions to this rule. (See FIG. 7)

Figure 6:
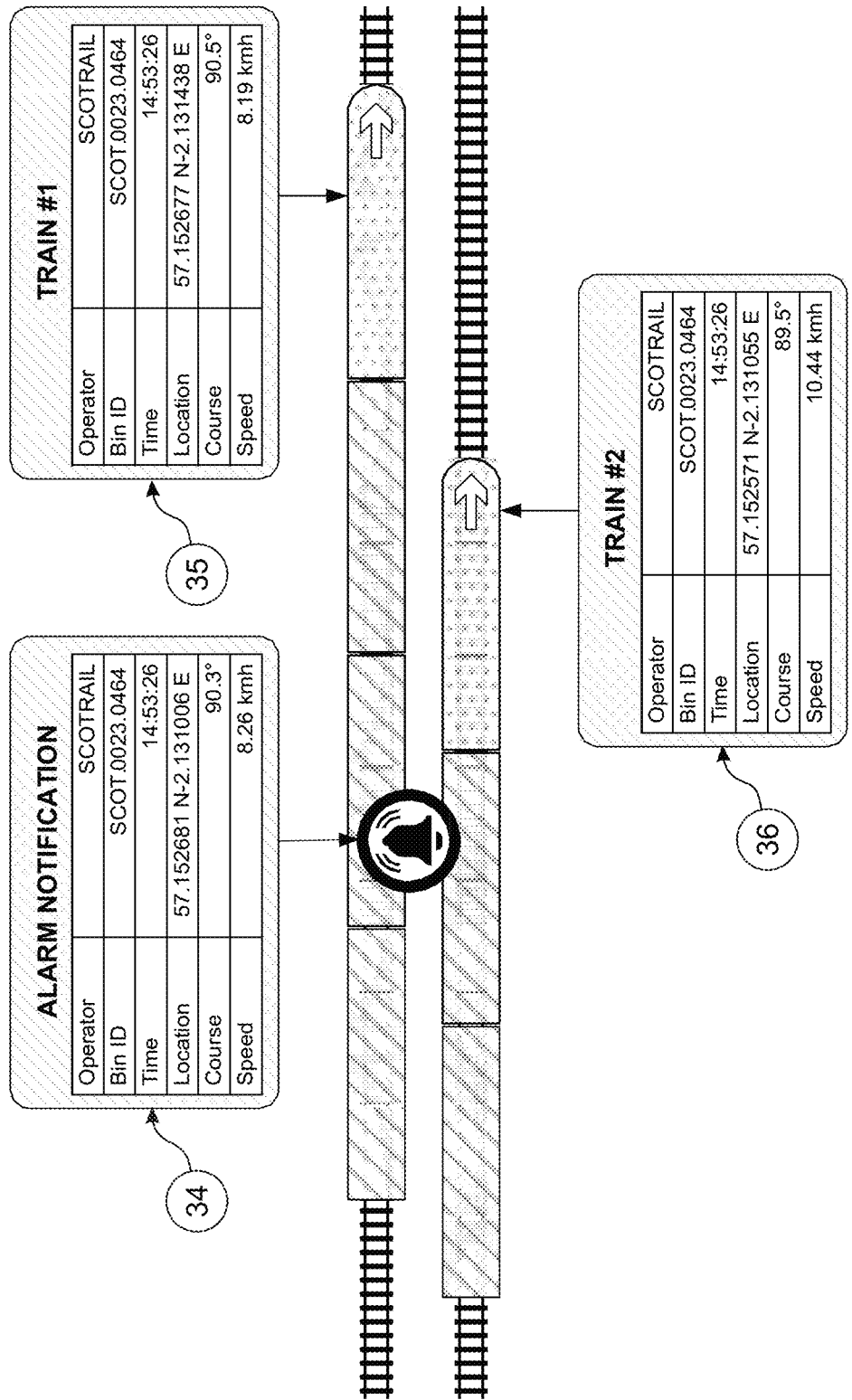
FIG. 6 is diagram of a plan view showing when to peer vote according to a preferred embodiment of the present invention.

Although this technique of 'speed at time' and 'course at location' will ensure that the Monitor/Relay only reacts to and takes ownership of those alarms that it should, there are still instances where more than one Monitor/Relay could take ownership of the same alarm notification. FIG. 6 shows one such instance.

Looking at FIG. 6 we see two trains from the same operator's fleet, moving on parallel tracks, and both heading into the same station at the same time. As they are doing this, one of the wheel sensors publishes a temperature alarm. Now extremely unlikely as this scenario is, it must still be considered, and so the question remains: which train should take ownership of the alarm?

Comparing the speeds and the directions of the alarm notification 34 to each train 35, 36 individually, then (initially) both Monitor/Relay systems would accept ownership of this alarm. However, comparing the speeds of TRAIN #1 to TRAIN #2 (as well as the directions), we can see that the alarm belongs to TRAIN #1. Given that each Monitor/Relay publishes its ownership claim of the alarm to the same Bin topic that the alarm was initially published to, both claims will subsequently be pushed to both Monitor/Relay systems.

Figure 7:
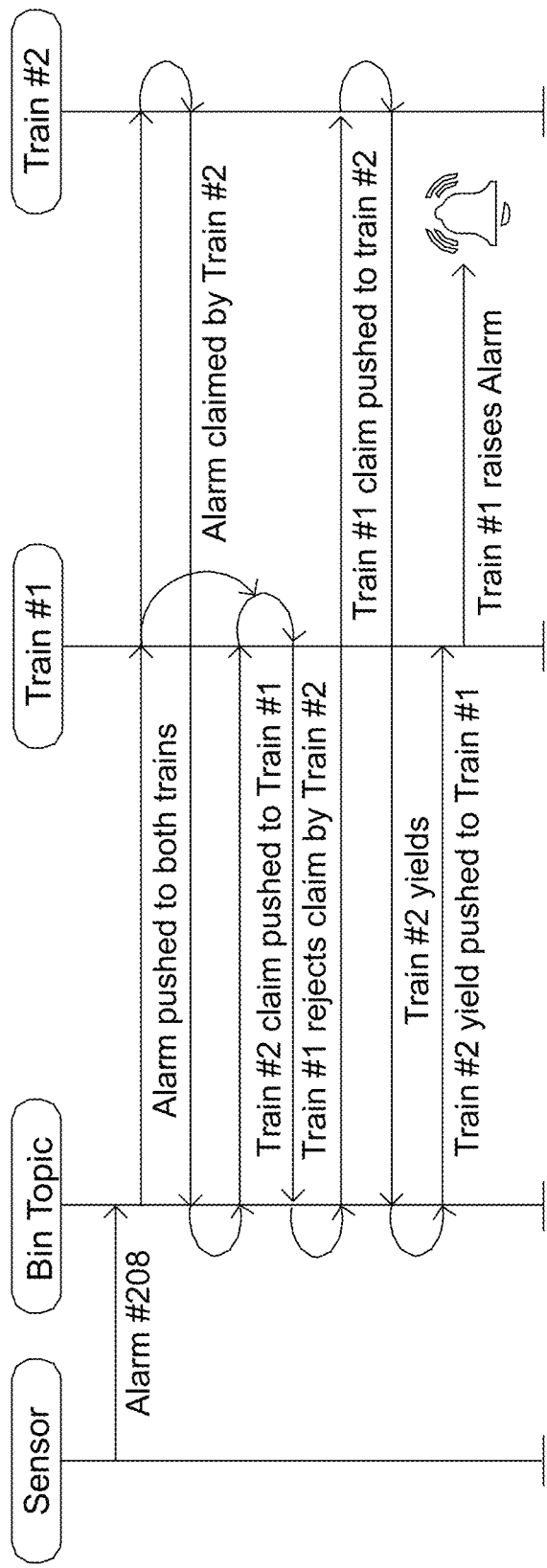
FIG. 7 is a diagram of a plan view showing peer voting in action according to a preferred embodiment of the present invention.

Each Monitor/Relay can now compare its own claim of the alarm notification against the claim made by its peer. One will yield and publish this 'yield' notification back to the Bin topic, allowing the actual owner of the alarm notification to raise an internal alarm within the cab alerting the driver to alarm as detected. The concept is shown in FIG. 7.

Figure 8:
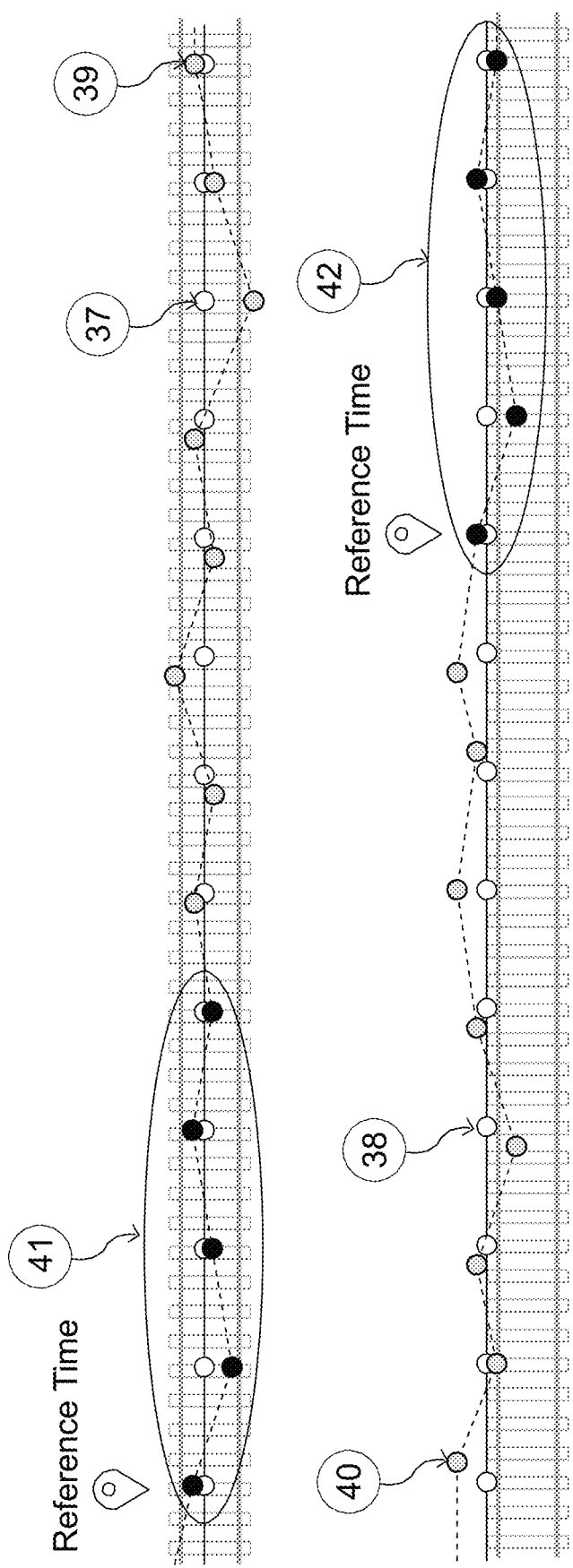
FIG. 8 is a diagram of a pan view showing Absolute and Relative Accuracy of GPS data according to a preferred embodiment of the present invention.

Referring now to FIG. 8, a crucial point to consider here is in regards the "absolute" accuracy of GPS data. By default, GPS location fixes are accurate to about four meters. This is not because of defects in the technology, but rather because of random offsets that are deliberately applied to the data to ensure that (although accurate) it's not pinpoint accurate! However, although "absolute" accuracy is not so great, "relative" accuracy (as can achieved through Differential GPS) is very high (typically to 10 cm), and so more than accurate enough to determine what wheel on what side of what bogie on what carriage—is causing a sensor to go into alarm.

Again, this relative accuracy is a product of rail locomotion, and goes back to FIG. 5 (understanding a moving carriage's vector at a fixed track position). Trains and carriages follow a series of fixed position vectors as they move. In FIG. 8 below, these fixed positions are shown as a series of white markers (items 37 and 38), while the GPS measured path of the Monitor/Relay 39 and the sensor 40 are shown in grey. As can be seen—due to GPS offsets, they do not completely correlate with the white markers.

However, looking at five location fixes (in black) shown after the "Reference Time" (items 41 and 42) we can see that both Monitor/Relay and sensor display the same offsets relative to the reference markers. Given that the position of the Monitor/Relay's GPS antenna is secured to a known and measured location (ideally on the roof of the engine), this means that (knowing the course and geometry of each carriage) we can calculate (to 10 cm) the position of the affected sensor relative to the Monitor/Relay's GPS antenna position.

There are two principle advantages in this invention, namely: the ability to automatically associate sensors to trains without having to manage complex (and difficult to maintain) asset hierarchy structures; the ability to have rail carriage wheel bearing temperature alarms brought to the immediate attention of either the train driver, or the trains computerized safety management system.

This invention makes use of three distinct methodologies to link the data from those sensors to the specific moving assets they are secured to. In effect, it addresses the problem of knowing what carriages make up what trains, by "dynamically" associating moving sensors with the correct engine and the Monitor/Relay mounted within the cab of that engine. Basically, the invention doesn't need to know what carriages make up the complete train. Further: almost no configuration is required (beyond allocating each sensor to a specific rail operator), and this allows for extremely rapid commissioning, while at the same time ensuring that only those alarms which relate to a specific train are sent to the Management Console of that train.

This invention not only reduces the overall data bandwidth requirements of the system, it also significantly reduces the processing overhead required by each cab's Management Console to correctly identify and take ownership of those alarms which relate to each train.

Thus, embodiments of this system described herein are necessarily rooted in a computer processor having inventive software to perform proactive operations to overcome problems specifically arising in the realm of the Rail Industry.

Specifically, they allow standalone wireless sensors that are secured to the wheels of moving rail coaches, to be dynamically associated with the complete train, thereby allowing alarm and status data to be passed from those sensors to a single sensor computer (Monitor/Relay Console) located in the train driver's cab that might otherwise result in a great expense or worse, catastrophic failure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for linking alarm data from a plurality of wireless sensors, which are physically disassociated, to a train in motion, each of the plurality of wireless sensors being secured to a separate wheel axle-box of a rail carriage of a train to detect an over temperature alarm in order to enable a driver to slow or stop the train, the system comprising:

an in-cab monitor including a processor connected to a memory, a keypad, a display, a GPS, a cellular modem and a network, a current location of each of the plurality of wireless sensors being fixed with the GPS, the current location of the one of the plurality of wireless sensors experiencing the over temperature alarm is determined by the GPS and is published with relevant details of the over temperature alarm over a cellular wireless transmitter to a "Publish and Subscribe" Message Broker, any relevant details of the over temperature alarm are pushed to a Server where the over temperature alarm is then validated, each of the plurality of sensors is individually and externally subscribing to an appropriate location bin topic, the current location from the GPS of the one of the plurality of sensors experiencing the over temperature alarm is transcribed into the appropriate location bin topic for the "Publish and Subscribe" Message Broker, wherein the any relevant details of the over temperature alarm are then published to the appropriate location bin topic, a geographic location of a monitor/relay that is mounted in a driver's cab at a front end of an engine of the train is fixed with the GPS, the geographic location of the monitor/relay is used to subscribe to a "location bin topic" to which the server just published the any relevant details of the over temperature alarm, a wheel alarm notification is pushed to the monitor/relay with the "Publish and Subscribe" Message Broker, validation checks with the monitor/relay are carried out to determine whether the over temperature alarm as received, is associated with a coach of the train, wherein if a condition of the over temperature alarm is confirmed as belonging to the train, the Monitor/Relay immediately notes that there is a problem.

2. The system for linking alarm data from the plurality of wireless sensors, which are physically disassociated, to the train in motion according to claim 1, further comprising each country of the world being divided into a Urchin Tracking Module based cell grid of "Bins", and assigning each Bin a unique, fourteen-digit Identifier consisting of a four-digit operator code, a four-digit incremental Longitude number, as well as a four-digit incremental Latitude number, with three point separating characters between each group.

3. The system for linking alarm data from the plurality of wireless sensors, which are physically disassociated, to the train in motion according to claim 2, further comprising the Bin identifiers being used as "location bin topics" for the "Publish and Subscribe" Message Broker, with each "location bin topic" effectively identifying a specific geographic area, roughly 10 km by 10 km in size, and wherein when any sensor goes into alarm, the sensor's GPS location is used to determine exactly what Bin the alarm was raised in, and a new alarm notification is then published to that Bin's specific identifier topic.

4. The system for linking alarm data from the plurality of wireless sensors, which are physically disassociated, to the train in motion according to claim 1, wherein each train's Monitor/Relay determines its own GPS position, and wherein the position is used to continuously recalculate what Bins it is moving through and what associated "location bin topic" in the "Publish and Subscribe" Message Broker it must both subscribe to and unsubscribe from.

5. The system for linking alarm data from the plurality of wireless sensors, which are physically disassociated, to the train in motion according to claim 4, wherein the actual number of Bins that the train's Monitor/Relay will be subscribed to is determined by its speed.

6. The system for linking alarm data from the plurality of wireless sensors, which are physically disassociated, to the train in motion according to claim 5, wherein three Bins are designated for low-speed speed commuter services, and wherein up to six Bins are designated for high-speed cross-country services, the designations being referred to as "Rolling Location Binning".

7. The system for linking alarm data from the plurality of wireless sensors, which are physically disassociated, to the train in motion according to claim 6, further comprising determining whether any individual Monitor/Relay either accepts or rejects the over temperature alarm notification it has received, wherein every coach follows the path of the coach in front of it, and as such, for a specific ground position, whatever a direction vector of a carriage moving over that position, all carriages in the train have the same direction vector while moving over that position, wherein each train's Monitor/Relay receives, processes and saves:
a 'fix' of its GPS location as well as, and its speed over ground and its direction every second, and when the Monitor/Relay receives an over temperature alarm notification, it compares its own speed against the speed of the sensor, at the time when the over temperature alarm was initially reported, and then compares its direction at the exact geographic location where the over temperature alarm was initially reported, wherein the two checks allow the Monitor/Relay to either accept or reject ownership of the over temperature alarm it received, and wherein the Monitor/Relay then publishes this decision to the same "location bin topic" that the over temperature alarm notification was initially published to.

8. The system for linking alarm data from the plurality of wireless sensors, which are physically disassociated, to the train in motion according to claim 7, further comprising when at least two trains from a same operator's fleet, are moving on parallel tracks, and are both heading into the same station at the same time, and one of the wheel sensors on either of the at least two trains publishes an over temperature alarm, both monitor/Relay systems will accept ownership of the over temperature alarm.

9. The system for linking alarm data from the plurality of wireless sensors, which are physically disassociated, to the train in motion according to claim 8, further comprising the speeds of at least a first train to at least a second train are compared, as well as the directions, and given that each Monitor/Relay publishes its ownership claim of the over temperature alarm to the same "location Bin topic" that the over temperature alarm was initially published to, both claims will subsequently be pushed to both Monitor/Relay systems, wherein each Monitor/Relay compares its own claim of the over temperature alarm notification against the claim made by its peer, one will yield and publish this 'yield' notification back to the "location Bin topic", allowing the actual owner of the over temperature alarm notification to raise an internal over temperature alarm within the cab, alerting the driver to the over temperature alarm as detected.

10. The system for linking alarm data from the plurality of wireless sensors, which are physically disassociated, to the train in motion according to claim 1, wherein the network is one of a LAN and a WLAN.

11. The system for linking alarm data from the plurality of wireless sensors, which are physically disassociated, to the train in motion according to claim 1, wherein the monitor/relay automatically associates itself with any wireless sensor that reports an over temperature alarm against any wheel in the current train.

12. The system for linking alarm data from the plurality of wireless sensors, which are physically disassociated, to the train in motion according to claim 1, wherein operation of the monitor/relay does not require any knowledge about the engine or carriage configuration.

13. The system for linking alarm data from the plurality of wireless sensors, which are physically disassociated, to the train in motion according to claim 1, wherein the relevant details of the over temperature alarm include temperature rise.

14. The system for linking alarm data from the plurality of wireless sensors, which are physically disassociated, to the train in motion according to claim 1, wherein the monitor/relay allows multiple faults to be stored in memory for review by track-side maintenance.

15. The system for linking alarm data from the plurality of wireless sensors, which are physically disassociated, to the train in motion according to claim 1, wherein all communications by the plurality of sensors is via wireless cellular signals.

16. The system for linking alarm data from the plurality of wireless sensors, which are physically disassociated, to the train in motion according to claim 7, wherein all communications by the plurality of sensors is via wireless cellular signals.

17. A system for linking alarm data from a plurality of wireless sensors, which are physically disassociated, to a train in motion, each of the plurality of wireless sensors being secured to a separate wheel axle-box of a rail carriage of a train to detect an over temperature alarm in order to enable a driver to slow or stop the train, the system comprising:
- an in-cab monitor including a processor connected to a memory, a keypad, a display, a GPS, a cellular modem and a network,
- a current location of each of the plurality of wireless sensors being fixed with the GPS,
- the current location of the one of the plurality of wireless sensors experiencing the over temperature alarm is determined by the GPS and is published with relevant details of the over temperature alarm over a cellular wireless transmitter to a "Publish and Subscribe" Message Broker, wherein all alarm data from each of the plurality of sensors is sent directly to a train wide common monitor system for validation,
- any relevant details of the over temperature alarm are pushed to a Server where the over temperature alarm is then validated,
- the current location from the GPS of the one of the plurality of sensors experiencing the over temperature alarm is transcribed into the appropriate location bin topic for the "Publish and Subscribe" Message Broker, wherein the any relevant details of the over temperature alarm are then published to the appropriate location bin topic,
- a geographic location of a monitor/relay that is mounted in a driver's cab at a front end of an engine of the train is fixed with the GPS,
- the geographic location of the monitor/relay is used to subscribe to a "location bin topic" to which the server just published the any relevant details of the over temperature alarm,
- a wheel alarm notification is pushed to the monitor/relay with the "Publish and Subscribe" Message Broker,
- validation checks with the monitor/relay are carried out to determine whether the over temperature alarm as received, is associated with a coach of the train, wherein if a condition of the over temperature alarm is confirmed as belonging to the train, the Monitor/Relay immediately notes that there is a problem.

18. A system for linking alarm data from a plurality of wireless sensors, which are physically disassociated, to a train in motion, each of the plurality of wireless sensors being secured to a separate wheel axle-box of a rail carriage of a train to detect an over temperature alarm in order to enable a driver to slow or stop the train, the system comprising:
- an in-cab monitor including a processor connected to a memory, a keypad, a display, a GPS, a cellular modem and a network,
- a current location of each of the plurality of wireless sensors being fixed with the GPS,
- the current location of the one of the plurality of wireless sensors experiencing the over temperature alarm is determined by the GPS and is published with relevant details of the over temperature alarm over a cellular wireless transmitter to a "Publish and Subscribe" Message Broker, wherein all alarm data from each of the plurality of sensors is sent directly to a train wide common monitor system for validation,
- any relevant details of the over temperature alarm are pushed to a Server where the over temperature alarm is then validated,
- each of the plurality of sensors is individually and externally subscribing to an appropriate location bin topic, the current location from the GPS of the one of the plurality of sensors experiencing the over temperature alarm is transcribed into the appropriate location bin topic for the "Publish and Subscribe" Message Broker, wherein the any relevant details of the over temperature alarm are then published to the appropriate location bin topic,
- a geographic location of a monitor/relay that is mounted in a driver's cab at a front end of an engine of the train is fixed with the GPS,
- the geographic location of the monitor/relay is used to subscribe to a "location bin topic" to which the server just published the any relevant details of the over temperature alarm,
- a wheel alarm notification is pushed to the monitor/relay with the "Publish and Subscribe" Message Broker,
- validation checks with the monitor/relay are carried out to determine whether the over temperature alarm as received, is associated with a coach of the train, wherein
- if a condition of the over temperature alarm is confirmed as belonging to the train, the Monitor/Relay immediately notes that there is a problem.

* * * * *